US009703319B2

(12) United States Patent
Guo et al.

(10) Patent No.: US 9,703,319 B2
(45) Date of Patent: Jul. 11, 2017

(54) CURVED SURFACE ADJUSTMENT STRUCTURE FOR LED DISPLAY SCREEN AND LED DISPLAY SCREEN

(71) Applicant: Shenzhen Create LED Electronics Co., Ltd., Shenzhen, Guangdong (CN)

(72) Inventors: Furong Guo, Guangdong (CN); Zhoukun Wang, Guangdong (CN)

(73) Assignee: Shenzhen Create LED Electronics Co., Ltd., Shenzhen, Guangdong (CN)

(*) Notice: Subject to any disclaimer, the term of this patent is extended or adjusted under 35 U.S.C. 154(b) by 0 days.

(21) Appl. No.: 15/021,281

(22) PCT Filed: Dec. 13, 2013

(86) PCT No.: PCT/CN2013/089393
§ 371 (c)(1),
(2) Date: Mar. 11, 2016

(87) PCT Pub. No.: WO2015/043086
PCT Pub. Date: Apr. 2, 2015

(65) Prior Publication Data
US 2016/0224056 A1    Aug. 4, 2016

(30) Foreign Application Priority Data

Sep. 30, 2013 (CN) .......................... 2013 1 0465612

(51) Int. Cl.
*G06F 1/16*    (2006.01)
*G09F 9/33*    (2006.01)
*G09F 9/30*    (2006.01)

(52) U.S. Cl.
CPC .............. *G06F 1/16* (2013.01); *G09F 9/301* (2013.01); *G09F 9/33* (2013.01)

(58) Field of Classification Search
CPC .............. G06F 1/16; G09F 9/301; G09F 9/33
(Continued)

(56) References Cited

U.S. PATENT DOCUMENTS 5,519,596 A    5/1996  Woolverton
2014/0110556 A1*  4/2014  Mao ....................... F16M 11/10
                                                        248/558

FOREIGN PATENT DOCUMENTS

CN    201247558    5/2009
CN    202561670    11/2012
(Continued)

OTHER PUBLICATIONS

International Search Report of PCT/CN2013/089393 dated May 16, 2014, 4 pages (Chinese and English Translations).

*Primary Examiner* — Tuan T Dinh
*Assistant Examiner* — Rockshana Chowdhury
(74) *Attorney, Agent, or Firm* — Rankin, Hill & Clark LLP (57) ABSTRACT

A curved surface adjustment structure for an LED display screen, and an LED display screen. An upper frame and a lower frame of a box body of the LED display screen are both formed by rotatably connecting hinge blocks. Each of the hinge blocks comprises a hinge block body, on which a rotating connecting structure and a locating structure are provided. The rotating connecting structure comprises a lug and a groove body which are respectively arranged on two side edges of each hinge block, and a lateral groove is provided in the groove body; the lug on one hinge block is inserted into the groove of another hinge block which is adjacent thereto, and is movably connected together through a limiting shaft; and an arc-shaped groove hole, which is used as a motion track of the limiting shaft, is provided on the lug.

9 Claims, 6 Drawing Sheets

(58) Field of Classification Search
USPC .......................................................... 361/807
See application file for complete search history.

(56) References Cited

FOREIGN PATENT DOCUMENTS

| | | | | |
|---|---|---|---|---|
| CN | 202871203 | | 4/2013 | |
| CN | 202976713 U | * | 6/2013 | ........... G09F 9/3026 |
| JP | 2006106046 | | 4/2006 | |

* cited by examiner

CURVED SURFACE ADJUSTMENT STRUCTURE FOR LED DISPLAY SCREEN AND LED DISPLAY SCREEN

TECHNICAL FIELD

The present application relates to the technical field of an LED display screen.

BACKGROUND

LED display screens have stable performances, high brightnesses, gorgeous images, and long usage periods. The LED display screens are also energy efficient and environmental friendly. Due to the aforesaid advantages of the LED display screens, they are widely used in outdoors and indoors photo-electric displaying fields. An LED display screen is usually composed of a plurality of LED box bodies. A normal LED box body is formed by four frame fringes, however, shapes of the frame fringes are stationary, and the LED box body can't be bent. The LED display screen composed of the LED box bodies is plate on the whole, due to limitation of the structure thereof, this kind of LED display screen can't be bent without the help of arc connecting pieces or being designed as a box body with an inherently certain arc angle. Therefore, under the circumstance of various shapes, it is hard to mount this kind of LED display screen onto a wall surface, which has become a main deficiency of a traditional LED display screen technology.

BRIEF SUMMARY

In order to overcome the drawbacks existing in the prior art, a purpose of the present invention is to provide a curved surface adjustment structure for an LED display screen, which enables the LED display screen to be bent.

Another problem to be solved by the present invention is to provide a LED display, which has a type of curved surface adjustment structure for the LED display screen, the LED display screen can be bent.

In order to solve the first technical problem, a technical solution taken by the present invention is as follows:

a curved surface adjustment structure for an LED display screen, comprising an upper frame and a lower frame of an LED display box body, wherein, both the upper frame and the lower frame are formed by rotatably connecting hinge blocks; each of the hinge blocks comprises a hinge block body, the hinge block body is provided thereon with a rotating connection structure and a locating structure;

the rotating connection structure comprises a lug and a groove body which are respectively arranged on two side edges of the hinge block, the groove body is provided with a lateral groove therein; a lug on one hinge block is inserted into a groove of another adjacent hinge block; the lug and the groove are movably connected together through a limiting shaft, the lug is provided thereon with an arc-shaped groove hole serving as a movement track of the limiting shaft;

the locating structure comprises an elastic locating pin mounted on a first base body and a bar-shaped groove mounted on a second base body and configured for matching with the elastic locating pin for locating; the elastic locating pin is snap-fitted into the bar-shaped groove so as to achieve a location of two adjacent hinge blocks and a fixation of relative positions of the two adjacent hinge blocks; the first base body is one of the lug and the groove body; and the second base body is another one of the lug and the groove body.

Preferably, at least three bar-shaped grooves are provided, and are distributed in the shape of radiation on a surface of the lug.

Preferably; the arc-shaped groove hole are bent towards a front face direction of the LED display screen; an upper wall and a lower wall of the groove are respectively provided with a pair of mounting holes configured for mounting the limiting shaft; when the limiting shaft is located in the middle of the arc-shaped groove hole, a first gap configured for enabling the hinge block to rotate exists between a lateral side of the hinge block where the lug is arranged and a lateral side of the adjacent hinge block where the groove is arranged, and a second gap configured for enabling the hinge block to rotate exists between an end of the lug and a bottom of the groove;

the elastic locating pin is mounted inside the lower wall of the groove; the bar-shaped groove is defined on a position of the lower surface of the lug corresponding to the elastic locating pin.

Preferably, two pairs of mounting holes are provided, the two pairs of mounting holes are respectively located at a front end and a back end of each of the upper wall and the lower wall of the groove; the front end is an end where the LED display screen is arranged, the back end is an end that is away from the LED display screen; two arc-shaped groove holes are provided to match with the two pairs of mounting holes respectively; an arc where the two arc-shaped groove holes are positioned is a concentric arc, and a length of the arc-shaped groove hole on the front end is shorter than a length of the arc-shaped groove hole on the back end.

Preferably, the bar-shaped groove is a kidney-shaped groove extending from front to back, arranged between the two arc-shaped groove holes, and located collinearly with a line connecting two homolateral endpoints of the two arc-shaped groove holes.

Preferably, three kidney-shaped grooves are provided, the three kidney-shaped grooves are distributed on a surface of the lug and in the shape of radiation, the three kidney-shaped grooves respectively correspond to a status of a fringe frame bent in an inner arc, a status of the fringe frame without being bent, and a status of the fringe frame bent in an outer arc; a middle line of a middle kidney-shaped groove is collinear with two middle lines of two arc-shaped groove holes; an outer lateral side of each of the two bilateral kidney-shaped grooves is collinear with a line connecting two homolateral endpoints of the two arc-shaped groove holes.

Preferably two elastic locating pins are provided, the two elastic locating pins are located between two mounting holes on the lower wall, when two adjacent hinge blocks are fixed together, the two elastic locating pins are received in the same bar-shaped groove.

Preferably, the limiting shaft is a bolt, and the mounting holes on the groove body are bolt holes.

Preferably, an edge of a joint of the hinge block body and the lug is a bevel edge, the lug is taper-shaped, an end of a short bottom edge of the taper-shaped lug is provided with an arc-shaped groove hole with a short arc length, an end of a long bottom edge of the taper-shaped lug is provided with an arc-shaped groove hole with a long arc length; an outer lateral side of the groove body matches with the bevel edge.

In order to solve the second technical problem mentioned above, a technical solution taken by the present invention is as follows:

an LED display screen constituted by a plurality of box bodies, wherein each box body of the LED display screen comprises a curved surface adjustment structure for LED display screen, the curved surface adjustment structure for LED display screen comprising an upper frame and a lower frame of the LED display box body, the upper frame and the lower frame are formed by rotatably connections of hinge blocks; each hinge block comprises a hinge block body, a rotating connection structure and a locating structure;

the rotating connection structure comprises a lug and a groove body which are respectively arranged on two side edges of the hinge block, the groove body is provided with a groove in a lateral direction therein; a lug on one hinge block is inserted into a groove of another adjacent hinge block; the lug and the groove are movably connected together through a limiting shaft, the lug is provided thereon with an arc-shaped groove hole serving as a movement track of the limiting shaft;

the locating structure comprises an elastic locating pin-mounted on a first base body and a bar-shaped groove mounted on a second base body and configured for matching with the elastic locating pin for locating; the elastic locating pin is snap-fitted into the bar-shaped groove so as to achieve location of two adjacent hinge blocks and a fixation of relative positions of the two adjacent hinge blocks; the first base body is one of the lug and the groove body, and the second base body is another one of the lug and the groove body.

Compared with the prior art, advantageous effects of the present invention lie in:

in the curved surface adjustment structure for the LED display screen of the present invention, the upper frame and the lower frame of the LED display screen box body are both formed by rotatably connected hinge blocks, and the rotation connection structure and the locating structure of the curved surface adjustment structure for the LED display screen achieve curve adjustments and locations of the upper frame and the lower frame. Moreover, the LED display screen of the present invention, which has the curved surface adjustment structure for the LED display screen and is composed of flexional box bodies can also be bent, such that a curve radian can be adjusted according to the installation environments. The limiting shaft moves in the designed arc-shaped groove hole track, so that different radian effects can be obtained. When the elastic locating pins are snap-fitted into different bar-shaped grooves, a location of two adjacent hinge blocks with different angles can be achieved. Moreover, the design of the curved surface adjustment structure for the LED display screen of the present invention makes a structure of curved LED display screen be stable, and further makes an operation for adjusting a curve surface be easier and smoother.

Wherein: 1. hinge block body; 10. lug; 11. groove; 12. limiting shaft; 13. arc-shaped groove hole; 14. mounting hole; 15. light bar mounting base; 20. elastic locating pin; 201. glass bread; 202. external thread; 203. spring; 203. outer casing; 21. bar-shaped groove; 3. lock bar lifting hole; 4. boom mounting hole; 5. control box; 6. boom; 7. light bar; 22. upper frame 22; 23. lower frame 23 23; 24. groove body.

DETAILED DESCRIPTION OF THE PREFERRED EMBODIMENT

The present invention will be further described in detail with reference to accompanying drawings and embodiments.

As shown in FIGS. 1-10, a type of LED display screen is composed of at least one LED box body; a LED light bar 7 is fixed on a front face of the LED box body, and a control box 5 a back face of the LED box body, and two boom 6s are fixed to both sides of the control box 5. The LED box body comprises a curved surface adjustment structure for the LED display screen, the structure comprises an upper frame 22 fringe and a lower frame 23 fringe of an LED display box body, the upper frame 22 fringe and the lower frame 23 fringe are formed by rotatably connecting hinge blocks together. A hinge block comprises a hinge block body 1, and the hinge block body 1 is provided thereon with a rotational connection structure and a locating structure.

The rotational connection structure comprises a lug 10 and a groove body 24 arranged at two sides of a hinge block respectively, the groove body 24 is provided with a lateral groove 11. A lug 10 of one hinge block is inserted into a groove 11 of another adjacent hinge block, the lug 10 and the groove 11 are movably connected by a limiting shaft 12, the lug 10 is provided thereon with arc-shaped groove holes 13 configured for enabling the limiting shaft 12 to move.

The locating structure comprises an elastic locating pin 20 mounted on a first base body, and a bar-shaped groove 21 mounted on a second base body and configured for matching with the elastic locating pin 20 for position. The elastic locating pin 20 is snap-fitted into the bar-shaped groove 21 so as to achieve a location of two adjacent hinge blocks and a fixation of relative positions of the two hinge blocks. The first base body is one of the lug 10 and the groove body 24, and the second base body is another one of the lug 10 and the groove body 24.

Figure 10:
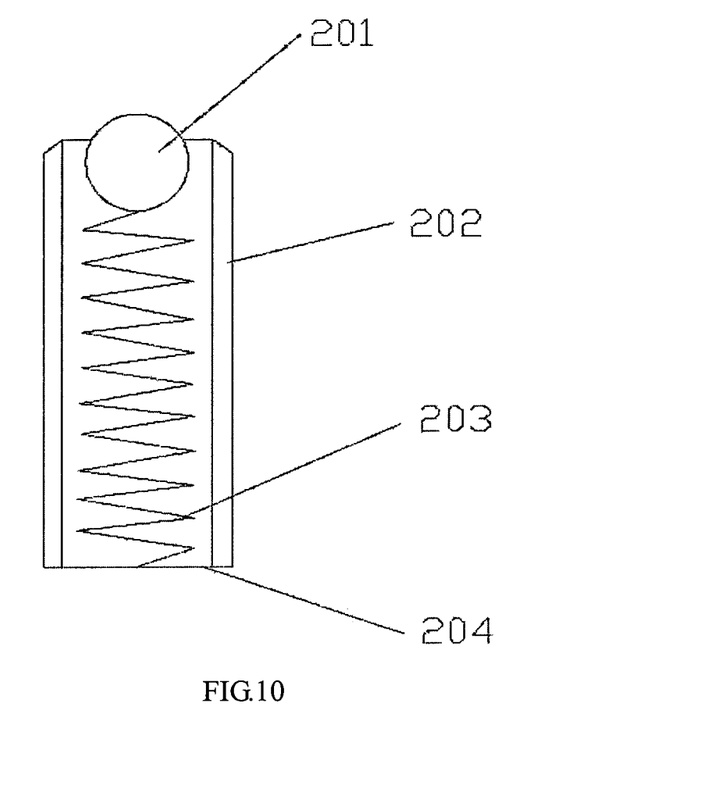
FIG. 10 illustrates a structural schematic view of an elastic locating pin of the present invention.

As shown in FIG. 10, the elastic locating pin 20 comprises an outer casing 204, an external thread, a spring 203 and a glass bead 201. One end of the spring 203 is fixed to an inner bottom of the outer casing 204, the other end of the spring 203 is connected to the glass bead 201. The outer casing 204 is provided with a circular open hole, a diameter the circular open hole is less than a diameter of the glass bead 201. When the spring 203 is under nature conditions, a volume of the glass bead 201 exposed outside the circular open hole is smaller than a volume of a hemisphere thereof, when the glass bead 201 is pressured by an external force, the glass bead 201 can be forced to enter the outer shell 204. The elastic locating pin 20 is mounted on the first base body by the external thread 202 thereof Front faces of the hinge blocks mounted on the upper fringe frame and the lower fringe frame of the box body are one-by-one correspondingly provided with light bar mounting bases 15, as a preferable embodiment of the present invention, each hinge block is provided with two light any mounting bases 15. A plurality of LED light bars 7 are fixed and hung over the light bar mounting bases 15 on the upper fringe frame and the lower fringe frame, and adjacent light bars 7 are arrayed closely, thereby forming the LED display screen.

In the present embodiment, three bar-shaped grooves 21 are provided, the bar-shaped grooves 21 are distributed on a lower surface of the lug 10 and in the shape of radiation; a plurality of bar-shaped grooves 21 can be provided, thereby achieving a multi-geared regulation of a radian of the LED display screen. When five bar-shaped grooves 21 are provided, and the elastic locating pin 20 is snap-fitted into a middle bar-shaped groove 21, the LED display screen shapes as a plane; when the LED display screen is bent towards the front face thereof, the elastic locating pin 20 enters a next bar-shaped groove 21, at this moment, the LED display screen shapes as a greatly curved inner arc; when the LED display screen continues to be bent, the elastic locating pin 20 further enters the outermost bar-shaped groove 21, at this moment, the LED display screen shapes as a less curved inner arc. When the LED display screen is bent towards the back face thereof, it shapes as a curved outer arc, and it can also be adjusted to shape as a greatly curved outer arc or a less curved outer arc. Similarly, when six bar-shaped grooves 21 are provided, a six-geared radian regulation can be performed.

The arc-shaped groove holes 13 is bent towards the front face direction of the LED display screen. A pair of mounting holes 14 configured for mounting the limiting shaft 12 are respectively defined on an upper wall and a lower wall. When the limiting shaft 12 is placed in the middle of the arc-shaped groove hole 13, a first gap configured for enabling the hinge blocks to rotate exists between a lateral side of the hinge block where the lug 10 is mounted and a lateral side of an adjacent hinge block where the groove 11 is arranged, a second gap configured for enabling the hinge blocks to rotate exists between an end of the lug 10 and a bottom of the groove 11.

When an LED display screen in the plane shape is transformed into an LED display screen in the inner arc shape, it needs to rotate the adjacent hinge blocks towards the front of the LED display screen, at this time, the lug 10 is rotated around the limiting shaft 12, and the position of the limiting shaft 12 is meanwhile moved from a middle of the arc-shaped groove 13 to an external end of the arc-shaped groove 13. Not only rotations of adjacent hinge blocks, but also movements of relative positions of the arc-shaped groove 13 and the limiting shaft 12 can be achieved by the arc-shaped groove 13, such that a close contact of adjacent light bars 7 on adjacent hinge blocks can be ensured, and it can be avoided that large gaps are generated and an appearance of the LED display screen is affected.

The elastic locating pin 20 is mounted inside an inner wall of the groove 11. The bar-shaped groove 21 is positioned at a place of the lower surface of the lug 10 corresponding with the elastic locating pin 20.

There are two pairs of mounting holes 14 located at a front end and a back end of the upper wall of the groove 11 and a front end and a back end of the lower wall of the groove 11 respectively. The front end is an end configured for arranging the LED display screen, and the back end is an end oriented away from the LED display screen. Corresponding to the two pairs of mounting holes 14, two arc-shaped groove holes 13 are provided. An arc where the two arc-shaped groove holes 13 are located is a concentric arc, wherein a length of the arc-shaped groove hole 13 located at the front end is less than a length of the arc-shaped groove hole 13 located at the back end. In the present embodiment, two pairs of mounting holes 14 are provided, so that adjacent hinge blocks can be connected by two limiting shafts 12, such that stability of fringe frames of the box body is enhanced; moreover, a bending ability of LED display screen can be achieved by the two arc-shaped groove holes 13, which enables a more flexible adjustment for rotations.

The bar-shaped groove 21 is a kidney-shaped groove extended from front to back and arranged between the two arc-shaped groove holes 13, the kidney-shaped groove is collinear with a line which connects homolateral ends of the two arc-shaped groove holes 13. Said configuration can ensure implementation of location within an arc range of rotations of the frame fringes.

Three kidney-shaped grooves are provided and distributed on a surface of the 10, and in the shape of radiation. The three kidney-shaped grooves respectively correspond to a status of the fringe frame with a curved inner arc, a status of the fringe frame without being bent, and a status of the fringe frame with a curved outer arc. A center line of a middle kidney-shaped groove is collinear with a center line of the two arc-shaped groove holes 13, and external lateral sides of the kidney-shaped grooves on both sides are collinear with line connecting homolateral ends of the two arc-shaped groove holes 13 respectively. When the elastic locating pin 20 is located in a first kidney-shaped groove, the fringe frame shapes as an inner arc; when the elastic locating pin 20 is located in a second kidney-shaped groove, the fringe frame doesn't bend, and the whole LED display screen shapes as a plane; when the elastic locating pin 20 is located in a third kidney-shaped groove, the fringe frame shapes as an outer arc. A movement track of the elastic locating pin 20 shapes as an arc, in order to make an operation to bend the LED display screen be more smoothly, the kidney-shaped grooves are distributed in the shape of radiation; thus, when elastic locating pins 20 are snap-fitted into each kidney-shaped groove, the elastic locating pins 20 are snap-fitted into the kidney-shaped grooves vertically and in lateral side directions, so that the operation is more conveniently.

In order to enhance a location accuracy and a stability of the LED display screen after being bent, two elastic locating pin 20 are provided and are positioned between the two mounting holes 14 in the lower wall. In the process of positioning, the two elastic locating pins 20 enter the same bar-shaped groove 21. Three, four, or more of the elastic locating pins 20 can also be provided, thereby further improving the locating accuracy and a stability degree.

The limiting shafts 12 are threads, the mounting holes 14 grooved on the groove body 24 are thread holes.

An edge of a connection portion of the hinge block body 1 and the lug 10 is a bevel edge, the lug 10 is taper-shaped, an end portion of a short bottom edge of the taper-shaped lug 10 is provided with an arc-shaped groove hole 13 having a short arc length, an end portion of a long bottom edge of the taper-shaped lug 10 is provided with an arc-shaped groove hole 13 having a long arc length. A bevel design can ensure a close contact of the LED display screen light bars 7 after being bent, thereby avoid generating a gap.

The hinge block on both sides of the upper frame 22 fringe of the LED box body is provided with a boom mounting hole 4 and a lock bar lifting hole 3, the boom mounting hole 4 is configured for being inserted by a bolt and thereby fixing a boom 6. The lock bar lifting hole 3 is configured for being inserted by a bolt and thereby connecting an upper box body and a lower box body together.

An included angle of every two adjacent hinge blocks on the upper frame 22 fringe of the box body of the LED display screen can vary, and thus different shapes can be formed, correspondingly, an LED display screen can appear different shapes. In the present embodiment, the upper frame 22 fringe of the box body of the LED display screen is formed by a connection of six hinge block bodies 1, when an included angle for location is formed between every two hinge blocks, that is, when the inner arc status or the outer arc status is generated, one frame fringe can have $2^6$ different curved shapes.

The usage mode of the present invention is as follows:

when the LED display screen shapes a plane, the limiting shaft 12 is placed in the middle of the arc-shaped groove hole 13, the elastic locating pin 20 is snap-fitted into the middle kidney-shaped groove, a gap exists between a bevel edge of the connection portion of the hinge block body 1 and the lug 10 and an external lateral side of the groove body 24.

Figure 1:
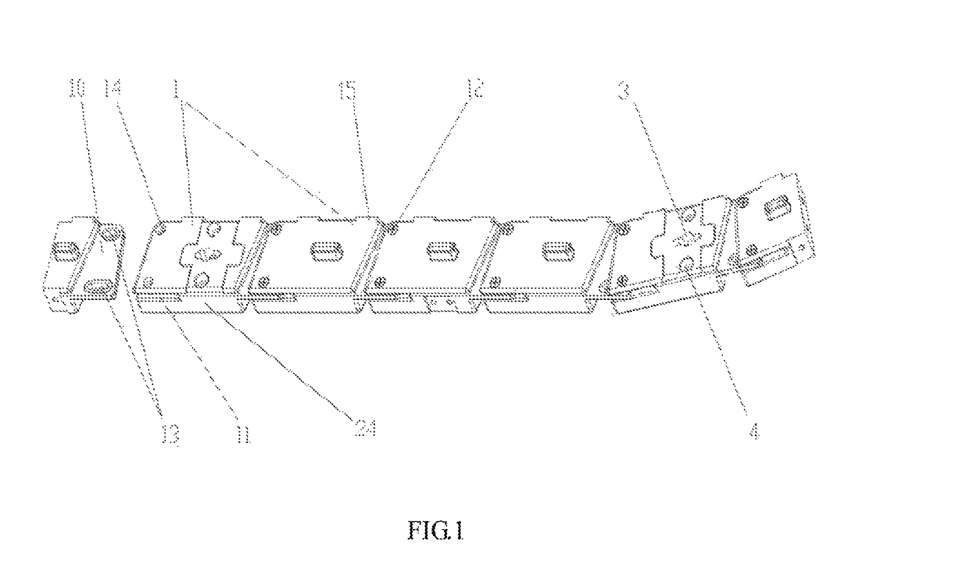
FIG. 1 illustrates a structural schematic view of an upper frame of the present invention.
Figure 2:
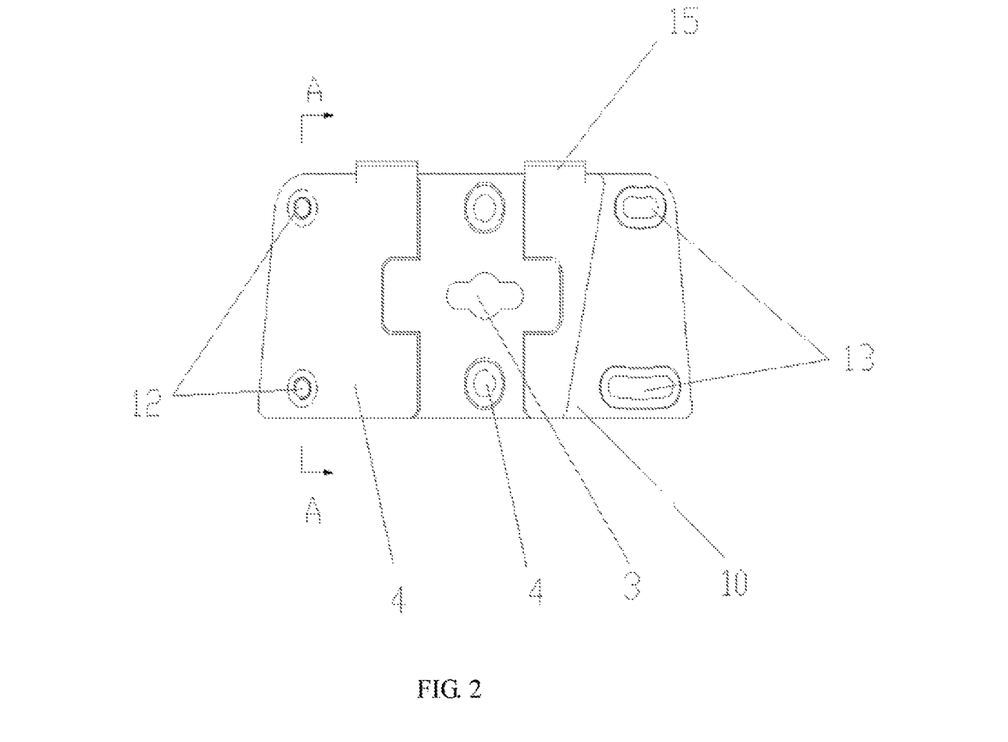
FIG. 2 illustrates a top view of a hinge block shown in FIG. 1.
Figure 3:
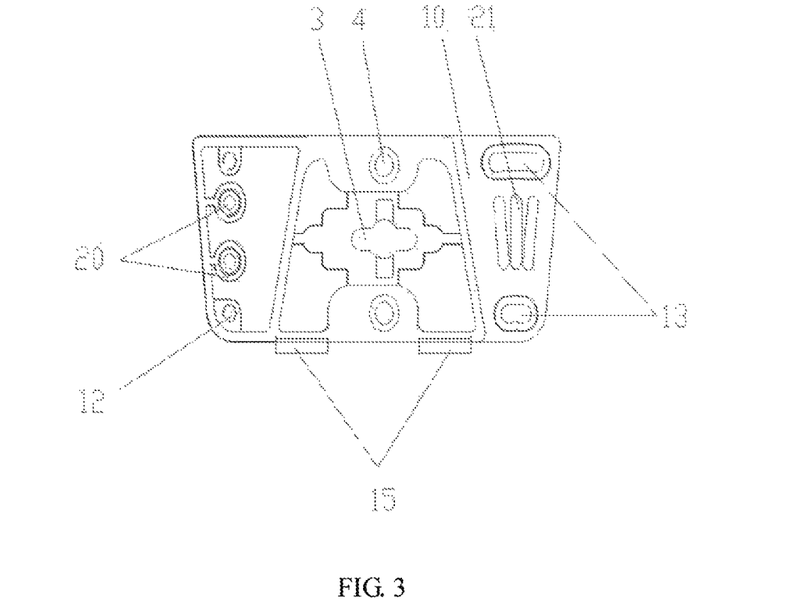
FIG. 3 illustrates a bottom view of the hinge block shown in FIG. 1.
Figure 4:
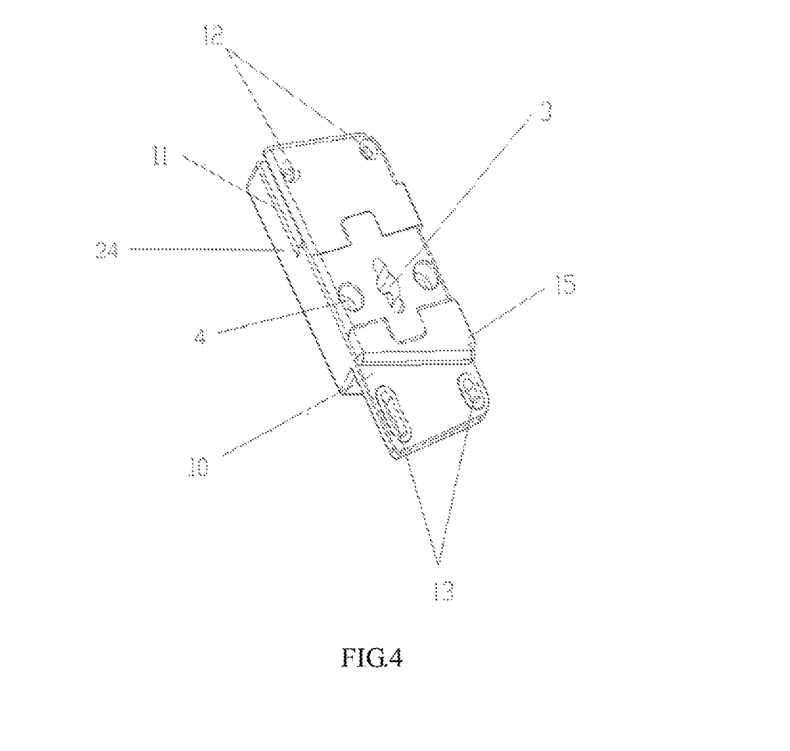
FIG. 4 illustrates a perspective view of a top surface of the hinge block shown in FIG. 1.
Figure 5:
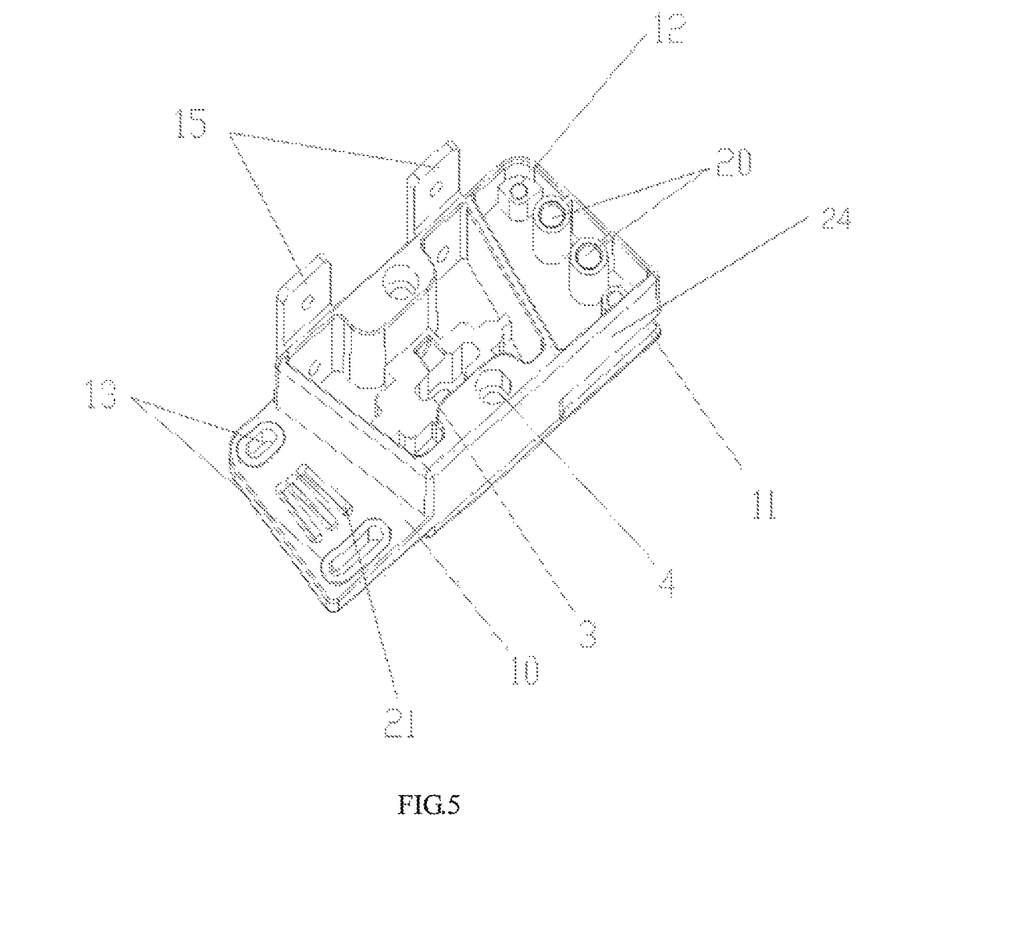
FIG. 5 illustrates a perspective view of a bottom surface of the hinge block shown in FIG. 1.
Figure 6:
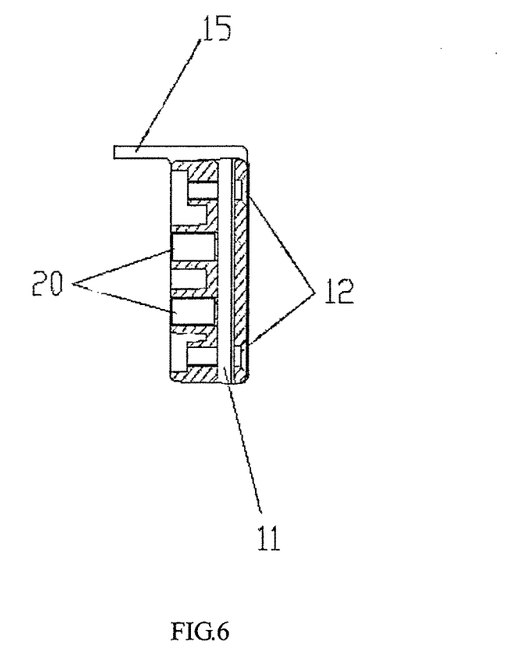
FIG. 6 illustrates a cutaway view along the A-A direction shown in FIG. 2.
Figure 7:
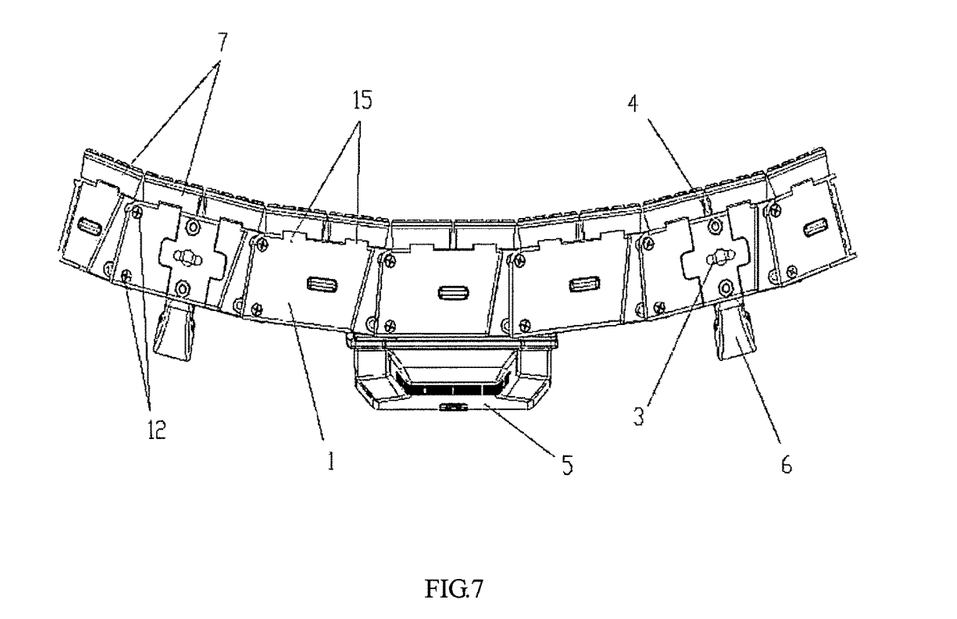
FIG. 7 illustrates a structural schematic view of the upper frame of the present invention in an inner arc status.

When the LED display screen is bent toward the front face thereof, adjacent hinge blocks rotate around the limiting shaft 12, meanwhile, positions of two limiting shafts 12 are moved from the middle of the arc-shaped groove hole 13 to an external end of the arc-shaped groove hole 13. At this time, a gap existing between a bevel edge ahead of a front end limiting shaft 12 and an external lateral side of the groove body 24 is decreased, however, a gap existing between a bevel edge behind the front end limiting shaft 12 and an external lateral side of the groove body 24 is increased. Thus, the LED display screen shapes as a curved inner arc.

Figure 8:
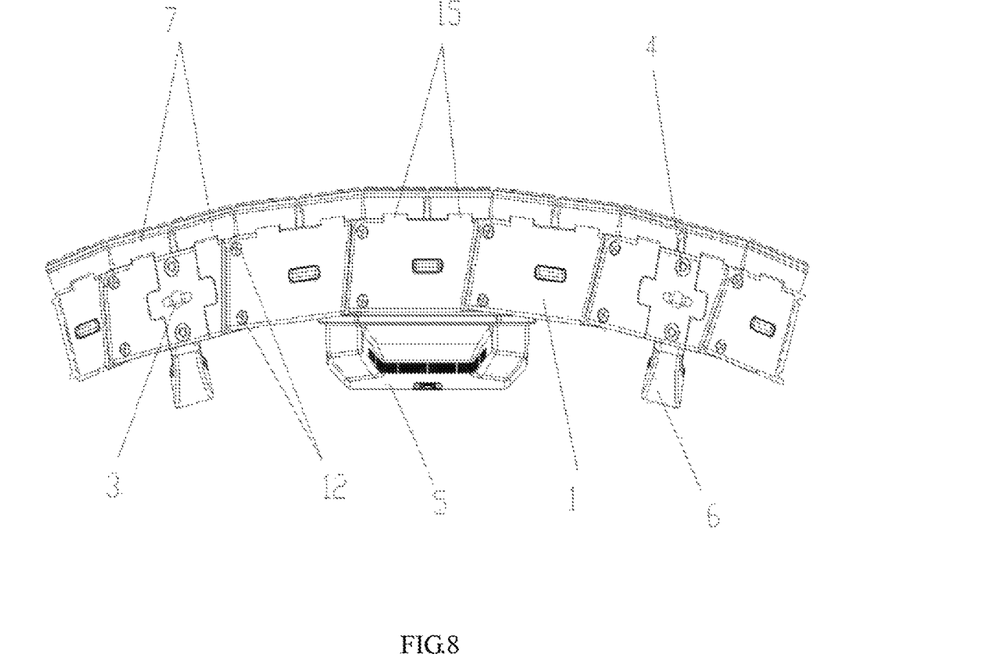
FIG. 8 illustrates a structural schematic view of the upper frame of the present invention in an outer arc status.
Figure 9:
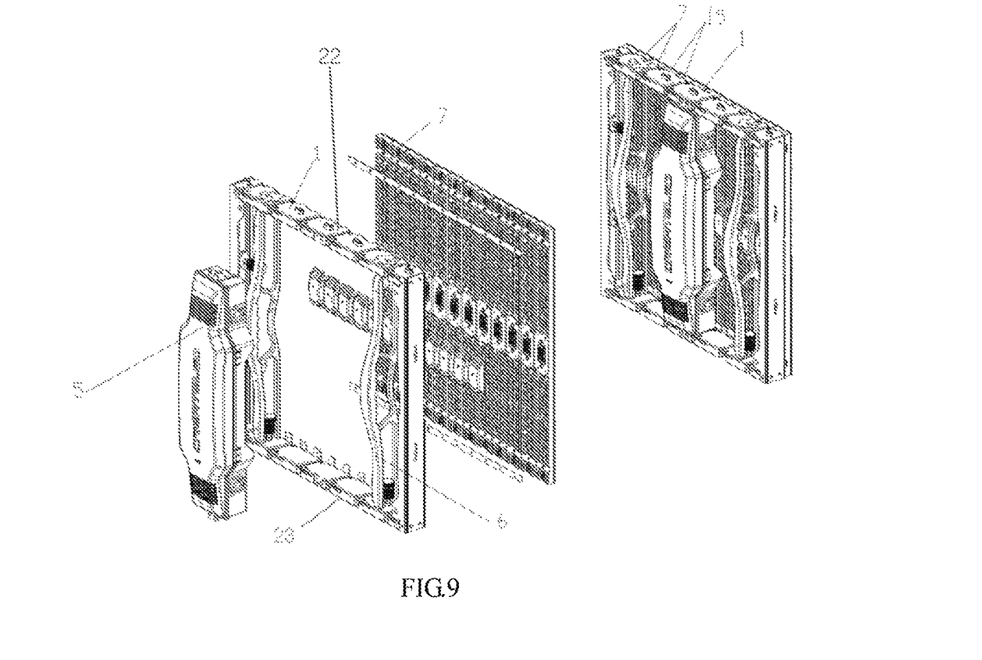
FIG. 9 illustrates a structural schematic view of an LED display screen of the present invention.

When the LED display screen is bent from a plane shape to a curved shape in the direction of the back face thereof, adjacent hinge blocks rotate around the limiting shaft 12, meanwhile, the positions of the two limiting shafts 12 are moved from the middle of the arc-shaped groove hole 13 to an internal end of the arc-shaped groove hole 13. At this time, a gap existing between a bevel edge ahead of a front end limiting shaft 12 and an external lateral side of the groove body 24 is increased, however, a gap existing between a bevel edge behind the front end limiting shaft 12 and an external lateral side of the groove body 24 contact and are matched with each other, thus, the LED display screen shapes as a curved outer arc.

Foregoing embodiments are preferable embodiments of the present invention merely, which should not be regarded as being limitation to the protection scope of the present invention, any unsubstantial variation or replacement made by those skilled in the art should all fall within the protection scope of the present invention.

The invention claimed is:

1. A curved surface adjustment structure for LED display screen, comprising an upper frame and a lower frame of an LED display box body, wherein both the upper frame and the lower frame are formed by rotational connections of hinge blocks; each of the hinge blocks comprises a hinge block body, the hinge block body is provided thereon with a rotating connection structure and a locating structure;

the rotating connection structure comprises a lug and a groove body which are respectively arranged on two side edges of the hinge block, the groove body is provided with lateral groove therein; a lug on one hinge block is inserted into a groove of another adjacent hinge block; the lug and the groove are movably connected together through a limiting shaft, the lug is provided thereon with an arc-shaped groove hole serving as a movement track of the limiting shaft;

the locating structure comprises an elastic locating pin mounted on a first base body and a bar-shaped groove mounted on a second base body and serving for matching with the elastic locating pin for locating; the elastic locating pin is snap-fitted into the bar-shaped groove so as to achieve a location of two adjacent hinge blocks and a fixation of relative positions of the two adjacent hinge blocks; the first base body is one of the lug and the groove body, the second base body is another one of the lug and the groove body;

wherein the arc-shaped groove hole are bent towards a front face direction of the LED display screen; an upper wall of the groove and a lower wall of the groove are respectively provided with a pair of mounting holes serving for mounting the limiting shaft; when the limiting shaft is located in the middle of the arc-shaped groove hole, there is a first gap that enables the hinge block to rotate between a lateral side of the hinge block where the lug is arranged and a lateral side of a groove of the adjacent hinge block where the groove is arranged, there is a second gap that enables the hinge block to rotate exists between an end of the lug and a bottom of the groove;

the elastic locating pin is mounted inside the lower wall of the groove; the bar-shaped groove is defined on a position of the lower surface of the lug corresponding to the elastic locating pin.

2. The curved surface adjustment structure for LED display screen according to claim 1, wherein at least three of the bar-shaped grooves are provided and are distributed in the shape of radiation on a surface of the lug.

3. The curved surface adjustment structure for LED display screen according to claim 1, wherein two pairs of mounting holes are provided, the two pairs of mounting holes are respectively located at a front end an a back end of each of the upper wall and the lower wall of the groove; the front end is an end where the LED display screen is arranged, the back end is an end that is away from the LED display screen; two arc-shaped groove holes are provided to match with the two pairs of mounting holes respectively; an arc where the two arc-shaped groove holes are positioned is a concentric arc, and a length of the arc-shaped groove hole on the front end is shorter than a length of the arc-shaped groove hole on the back end.

4. The curved surface adjustment structure for LED display screen according to claim 3, the bar-shaped groove is a kidney-shaped groove extending from front to back, arranged between the two arc-shaped groove holes, and is located collinearly with a line connecting two homolateral endpoints of the two arc-shaped groove holes.

5. The curved surface adjustment structure for LED display screen according to claim 4, wherein three kidney-shaped grooves are provided, the three kidney-shaped grooves are distributed on a surface of the lug and in the shape of radiation, the three kidney-shaped grooves correspond respectively to a status of a fringe frame bent in an inner arc, a status of the fringe frame without being bent, and a status of the fringe frame bent in an outer arc; a middle line of a middle kidney-shaped groove is collinear with two middle lines of two arc-shaped groove holes; an outer lateral side of each of the two bilateral kidney-shaped grooves is collinear with a line connecting two homolateral endpoints of the two arc-shaped groove holes.

6. The curved surface adjustment structure for LED display screen according to claim 1, wherein two elastic locating pins are provided, the two elastic locating pins are located between two mounting holes on the lower wall, when two adjacent hinge blocks are fixed together, the two elastic locating pins are received in the bar-shaped groove.

7. The curved surface adjustment structure for LED display screen according to claim 1, wherein the limiting shaft is a bolt, and the mounting holes on the groove body are bolt holes.

8. The curved surface adjustment structure for LED display screen according to claim 3, wherein an edge of a joint of the hinge block body and the lug is a bevel edge, the lug is taper-shaped, an end of a short bottom edge of the taper-shaped lug is provided with an arc-shaped groove hole with a short arc length, an end of a long bottom edge of the taper-shaped lug is provided with an arc-shaped groove hole with a long arc length; an outer lateral side of the groove body matches with the bevel edge.

9. An LED display screen constituted by a box body, wherein the box body of the LED display screen comprises the curved surface adjustment structure for LED display screen according to claim 1.

\* \* \* \* \*